United States Patent
Kim

(10) Patent No.: US 11,004,133 B1
(45) Date of Patent: May 11, 2021

(54) FIT CHARACTERISTICS FOR COMPARING GARMENTS

(71) Applicant: Amazon Technologies, Inc., Seattle, WA (US)

(72) Inventor: Bukyung Kim, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 981 days.

(21) Appl. No.: 14/676,373

(22) Filed: Apr. 1, 2015

(51) Int. Cl.
*G06Q 30/06* (2012.01)
*H04L 29/08* (2006.01)
*G06F 16/2457* (2019.01)

(52) U.S. Cl.
CPC ... *G06Q 30/0629* (2013.01); *G06F 16/24578* (2019.01); *H04L 67/10* (2013.01)

(58) Field of Classification Search
CPC .................................................. G06Q 30/00–08
See application file for complete search history.

(56) References Cited

U.S. PATENT DOCUMENTS

| | | | | |
|---|---|---|---|---|
| 2014/0143096 A1* | 5/2014 | Stubert | ................... | G06T 11/00 705/26.63 |
| 2015/0154453 A1* | 6/2015 | Wilf | ................... | G06K 9/00711 382/103 |

OTHER PUBLICATIONS

"Are Your Pants Lying to You? an Investigation" Abram Sauer, Esquire.com, Sep 7, 2010. <http://www.esquire.com/style/mens-fashion/a8386/pants-size-chart-090710/> (Year: 2010).*

* cited by examiner

*Primary Examiner* — Michael Misiaszek
(74) *Attorney, Agent, or Firm* — Lee & Hayes, P.C.

(57) ABSTRACT

Accessing measurements associated with garments and leveraging the measurements to determine fit characteristics associated with the garments is described. The fit characteristics may be leveraged to provide information about how a garment fits relative to another garment to streamline online shopping transactions. Fit characteristics may correspond to scores that are determined based at least in part on one or more measurements of a garment. Individual measurements may be standardized and/or weighted. The individual measurements may be combined to determine a score representative of a fit characteristic. Fit characteristics associated with two or more garments may be compared and a user interface may be caused to be displayed to compare garments. The user interface may summarize fit characteristic comparisons via textual descriptions, graphical representations, etc. Users may leverage fit characteristics and resulting user interfaces to comparison shop between various garments.

20 Claims, 9 Drawing Sheets

400

```
┌─────────────────────────────────────────────────────┐
│  DETERMINE SET OF FIT CHARACTERISTICS FOR FIRST GARMENT │
│                         402                          │
└─────────────────────────────────────────────────────┘
                          │
                          ▼
┌─────────────────────────────────────────────────────┐
│ DETERMINE SET OF FIT CHARACTERISTICS FOR SECOND GARMENT │
│                         404                          │
└─────────────────────────────────────────────────────┘
                          │
                          ▼
┌─────────────────────────────────────────────────────┐
│     COMPARE FIRST SET OF SCORES TO SECOND SET OF SCORES │
│                         406                          │
└─────────────────────────────────────────────────────┘
                          │
                          ▼
┌─────────────────────────────────────────────────────┐
│   CAUSE USER INTERFACE TO BE DISPLAYED TO COMPARE GARMENTS │
│                         408                          │
└─────────────────────────────────────────────────────┘
```

FIG. 4

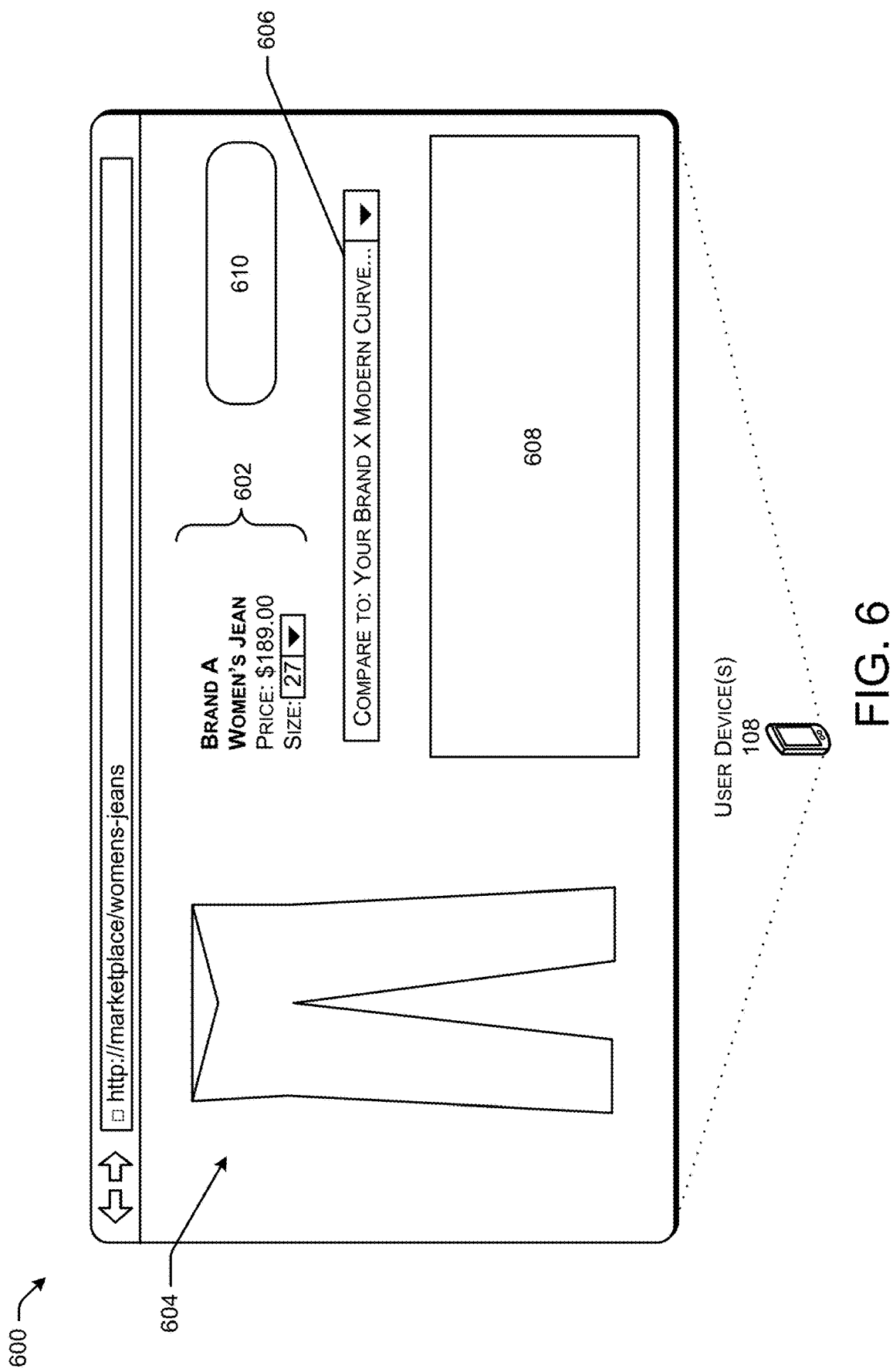

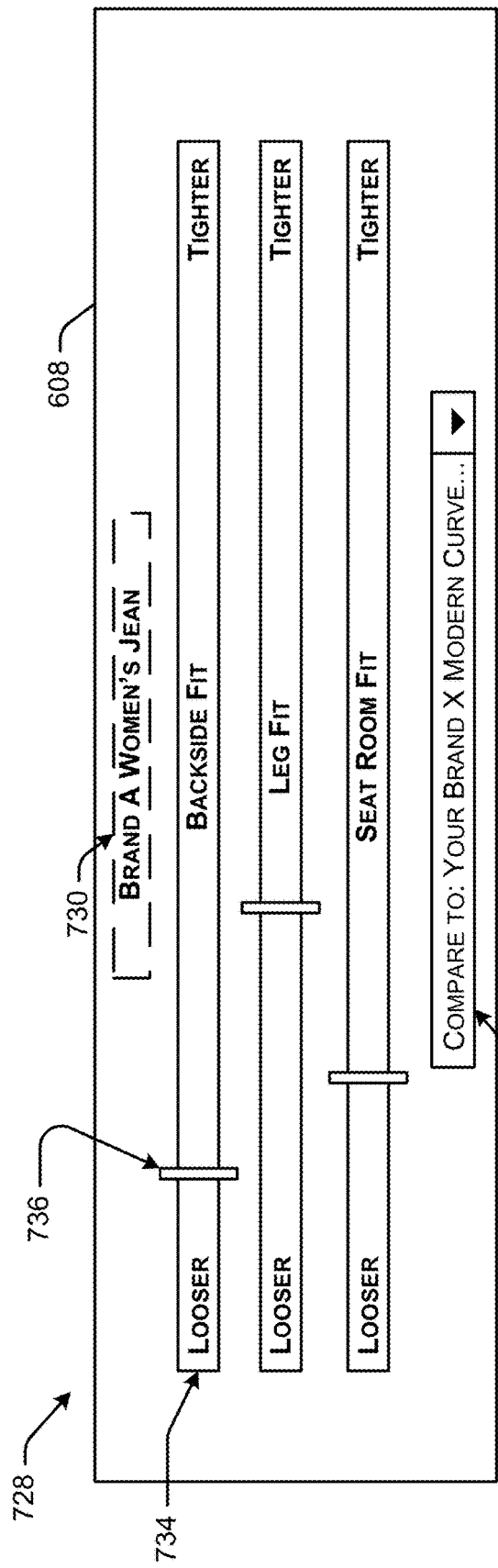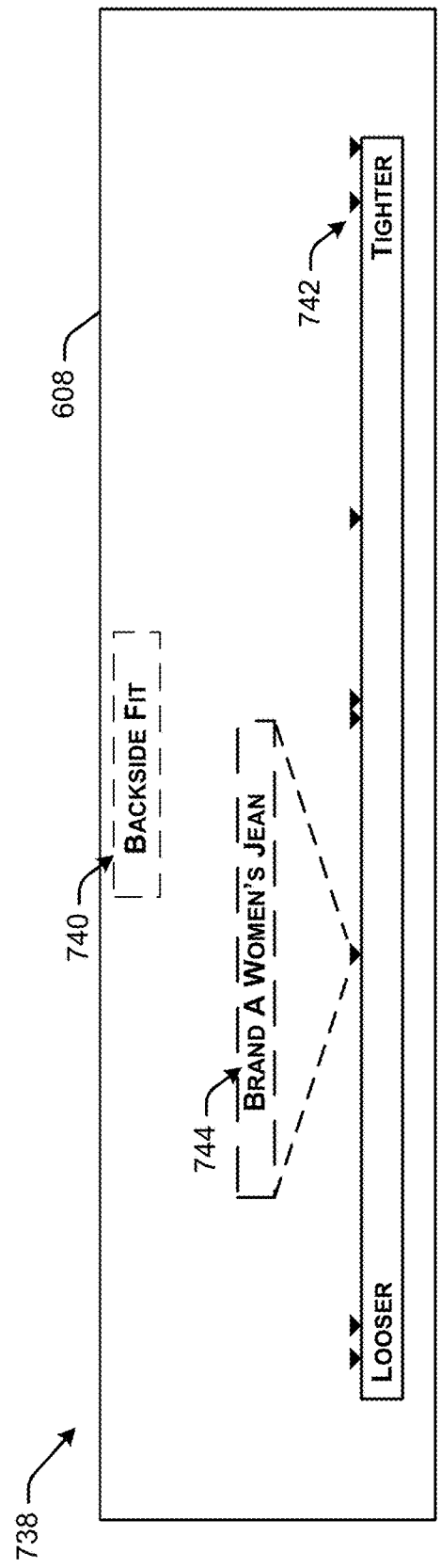

FIT CHARACTERISTICS FOR COMPARING GARMENTS

BACKGROUND

Online shopping has transformed retail in many ways. However, apparel is one area where consumers have not fully adopted the online shopping model. Consumers lack confidence in buying apparel online because of various concerns that are unique to the apparel industry. For instance, the apparel industry lacks size standardization, and fit varies from garment to garment. Generally, jeans are sized based on waist size and inseam. However, a pair of jeans may fit individuals with a same waist size and inseam (e.g., a same size) differently, making it difficult for a consumer to know whether a garment purchased online will fit. In brick-and-mortar stores, consumers can use fitting rooms to try on various garments prior to purchasing any of the garments. However, in online shopping models, consumers do not have the opportunity to try on desired garments before they buy the garments. Accordingly, clothing purchased online is returned at a significantly higher rate than clothing purchased in brick-and-mortar stores and many customers abandon online clothing purchases prior to completing them.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 4 is a flow diagram showing an illustrative process to cause a user interface for comparing fit characteristics between two or more garments to be displayed to a user.

FIG. 6 is a diagram showing an example user interface that may be presented to a user for comparing fit characteristics between two or more garments.

FIG. 7C is a diagram showing an example of a graphical representation for comparing fit characteristics between two garments.

FIG. 7D is a diagram showing an example of a graphical representation for comparing a plurality of garments with respect to a fit characteristic.

DETAILED DESCRIPTION

Figure 1:
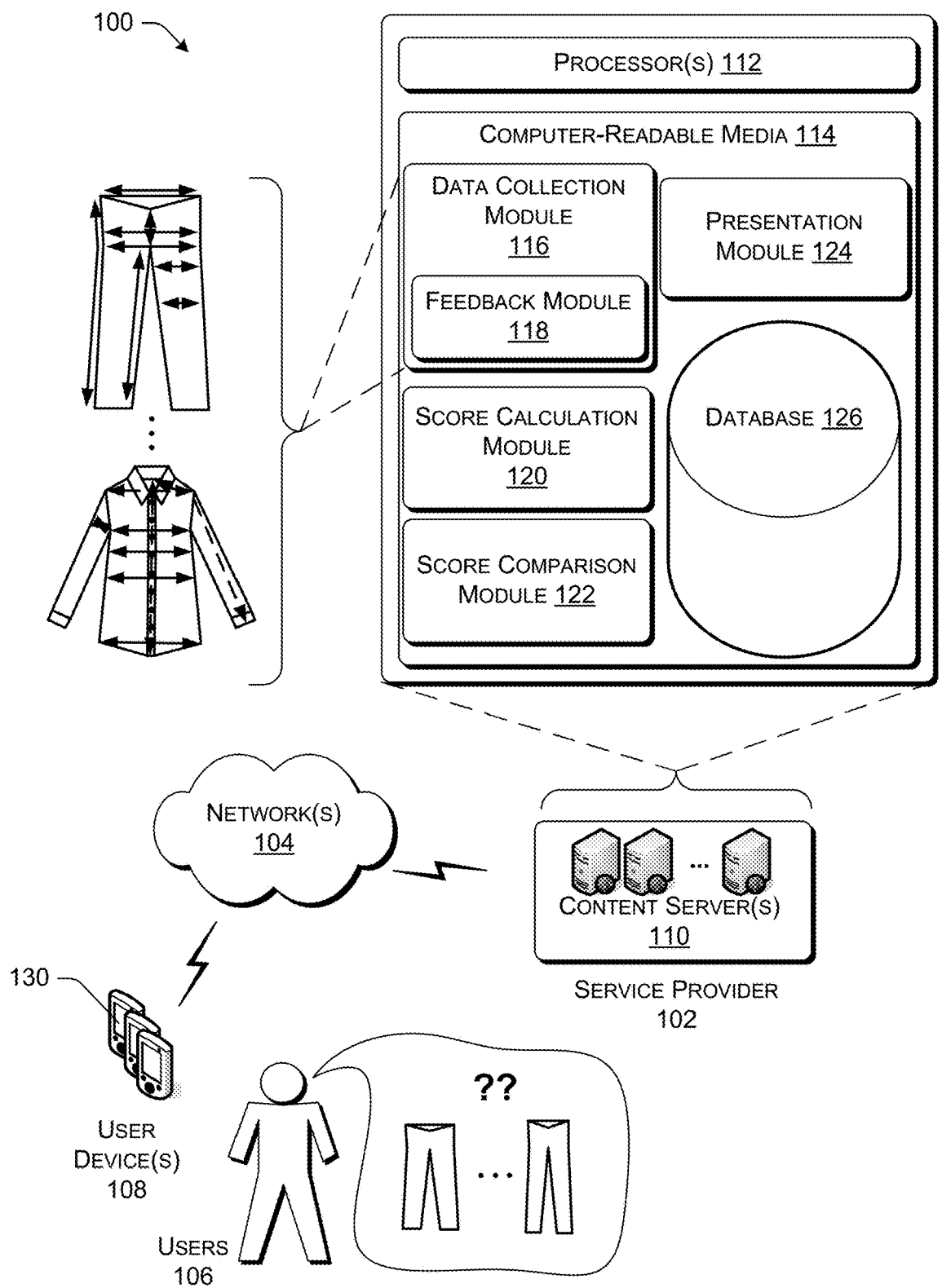
FIG. 1 is a diagram showing an example system for generating fit characteristics.

Techniques described herein include receiving measurements associated with garments and leveraging the measurements to calculate useful fit characteristics that provide information about how the garments fit. Fit characteristics may represent characteristics related to fit that users consider when purchasing particular garments. For instance, in addition to size, female consumers consider stretch when purchasing jeans. Additionally, male consumers consider leg fit and overall fit when purchasing jeans. Stretch, leg fit, and overall fit are not characteristics that users utilizing online shopping models can understand simply by size. Techniques described herein leverage the fit characteristics to provide information about how a garment fits relative to other garments. The fit characteristics may be utilized to provide accurate information to help consumers select garments that are a correct size and fit consistent with consumer preferences. Accordingly, techniques described herein lead to increased purchasing confidence, reduced return rates, and improved user satisfaction to streamline online shopping transactions.

For the purpose of this discussion, a garment may include any article of clothing (e.g., shirt, pant, shoe, hat, etc.). Garments may be offered for acquisition (e.g., purchase) in a plurality of sizes. Sizes may include any type of standardized designation (e.g., numbers (e.g., 2, 4, 6, etc.), measurements (e.g., 32, 34, etc.), letters (e.g., XS, S, M, etc.), etc.) based on standard sizing systems. Fit, on the other hand, describes how a body fills a garment. Fit may be used to describe comfort and/or how a garment hangs.

Fit characteristics represent characteristics related to fit that users consider when purchasing garments. Fit characteristics may be indirectly related to physical measurements of a garment. That is, fit characteristics may represent an attribute that is supplemental to the physical measurements of a garment that is indicative of the fit of the garment. In at least one example, fit characteristics may be an attribute that is utilized for comparison shopping and selecting garments in a manner that is similar to how users utilize size. A service provider, merchant, intermediary marketplace, etc., may determine various fit characteristics for various garments. For instance, for pants, the fit characteristics including stretch, comfort, fabric weight, overall fit, rise, backside fit, leg fit, seat comfort fit, etc. Alternatively, for shirts, the fit characteristics including stretch, comfort, fabric weight, overall fit, arm fit, shoulder fit, bust fit, etc. Additional or alternative fit characteristics may represent characteristics related to fit that users consider when purchasing other garments such as dresses, brassieres, etc. Moreover, fit characteristics for a garment may vary based on the intended gender of the purchaser associated with the garment. For instance, for women's pants, the fit characteristics may include backside fit, fabric weight, waist fit, leg opening fit, knee fit, thigh fit, stretch fit, and rise fit. Alternatively, for men's pants, the fit characteristics may include backside fit, fabric weight, waist fit, leg opening fit, knee fit, thigh fit, overall fit, and inseam fit.

In at least one example, fit characteristics may correspond to scores that are determined based at least in part on one or more measurements of a garment. The techniques described herein may determine a first score representative of a fit characteristic associated with a first garment. The first score may be determined based at least in part on accessing measurements associated with a first garment and standardizing the measurements relative to corresponding reference measurements. A service provider, merchant, etc. may combine the standardized measurements to determine the first score. In some examples, the individual measurements may be assigned weights representative of relative importance. The techniques described herein may further describe determining a second score representative of the fit characteristic associated with a second garment. The second score may be determined based at least in part on combining two or more standardized measurements associated with the second garment that are the same two or more measurements used to determine the first score for the first garment.

In some examples, fit characteristics may correspond to qualitative descriptions. For instance, a fit characteristic for stretch may correspond to no stretch, some stretch, and high stretch. Additionally or alternatively, a fit characteristic for fabric weight may correspond to light, medium, or heavy. Moreover, a fit characteristic for rise may correspond to low, mid, high, etc.

The system may compare corresponding fit characteristics and generate and cause a user interface to be displayed to a user. The user interface may summarize a relationship between the fit characteristics via textual descriptions, graphical representations, etc. Users may leverage fit characteristics and resulting user interfaces to comparison shop between various garments. In at least one example, the user may compare fit characteristics between a garment he or she already owns and a garment offered for sale via a service provider, merchant, intermediary marketplace, etc. In other examples, the user may compare fit characteristics between garments of a same brand and/or having a same fit style. Fit style may describe a particular cut of a garment such as boot cut jeans, trouser jeans, skinny jeans, etc. Comparison shopping between various garments enables sellers (e.g., service providers, merchants, intermediary marketplaces, etc.) to provide fit guidance with user preferences in mind in ways that a size recommendation is not able to capture. Fit characteristics may streamline online shopping and address problems uniquely inherent in online marketplaces, where customers are not able to try on articles for fit, by providing shoppers with more and better information than is traditionally available on garment tags or product listings available to shoppers in brick-and-mortar retail settings, reducing return rates and increasing conversion rates, as described above.

In addition to using fit characteristics to comparison shop between various garments, techniques described herein may be leveraged to recommend garments to users based at least in part on user preferences. For instance, a user may own a pair of jeans that he knows fits and would like a new pair of jeans to fit similarly everywhere except in the leg. That is, the user may want a new pair of jeans to have a slimmer leg fit. Accordingly, the user may search for jeans with a slimmer leg fit than the jeans he currently owns that otherwise have the same fit characteristics as the pair of jeans he owns. For instance, he could select the pair of jeans that he currently owns and indicate various fit characteristics (e.g., leg fit) that he would like to be different. Techniques described herein may leverage the scores representative of the fit characteristics to recommend new jeans that have a similar fit to the jeans the user owns but that have a slimmer leg fit.

As an additional or alternative example, a user may know brands of jeans that generally fit and would like a new pair of jeans to fit similarly but with more stretch. A user may search for jeans with more stretch than the brands she generally buys but that otherwise have similar fit characteristics to the jeans that she usually buys. For instance, she could select a brand of jeans that she usually purchases and indicate that she would like a new pair to have more stretch. Techniques described herein may leverage the scores representative of a stretch fit characteristic to recommend new jeans that have a similar fit to the brands of jeans the user usually purchases but that have more stretch.

Moreover, a user may have a pair of jeans that fits him perfectly and the user may want a new pair of jeans with a same fit. The user may enter measurements from the pair of jeans he has at home. The techniques described herein may utilize the measurements to calculate fit characteristics associated with the pair of jeans the user currently owns. The techniques described herein may leverage the scores associated with the fit characteristics to identify and recommend other jeans with the same fit characteristics to the user.

FIG. 1 is a diagram showing an example system 100 for generating fit characteristics. More particularly, the system 100 may include a service provider 102, one or more network(s) 104, one or more users 106, and one or more user devices 108 associated with the one or more users 106.

The service provider 102 may be any entity, server(s), platform, etc., that provides items (e.g., products, services, etc.) to users 106 (e.g., consumers) on behalf of other users 106 (e.g., merchants). The service provider 102 may be implemented in a non-distributed computing environment or may be implemented in a distributed computing environment, possibly by running some modules on user devices 108 or other remotely located devices. As shown, the service provider 102 may include one or more content server(s) 110, which may include one or more processor(s) 112 and computer-readable media 114. The content server(s) 110 may also include additional components not listed above that may perform any function associated with the content server(s) 110. In various embodiments, each of the content server(s) 110 may be any type of server, such as a network-accessible server.

In various examples, the service provider 102 may present items (e.g., products, services, etc.) to users 106 (e.g., consumers) on behalf of itself, other users 106 (e.g., merchants), etc. For the purpose of this discussion, the items may include apparel items such as garments, as described above. The service provider 102 described herein may cause one or more user interfaces to be presented to users 106 that promote or feature the items offered by the service provider 102 or the other users 106. The service provider 102 may receive data associated with a plurality of users 106 who acquire the items offered by the other users 106. Furthermore, the service provider 102 may access data associated with a plurality of garments. In at least one example, the service provider 102 may receive measurements associated with individual garments, characteristics associated with the garments, etc. The service provider 102 may leverage the data to calculate fit characteristics associated with the garments. In at least one example, the fit characteristics may comprise scores calculated based in part on standardizing the one or more measurements by comparing the one or more measurements to one or more corresponding reference measurements. The service provider 102 may leverage the fit characteristics to compare how two or more garments fit and may generate and cause user interfaces to be presented to the users 106 to visually summarize the relationship between the two or more garments in terms of fit.

In some examples, the network(s) 104 may be any type of network known in the art, such as the Internet. Moreover, the service provider 102 and/or the users 106 may communicatively couple to the network(s) 104 in any manner, such as by a wired or wireless connection. The network(s) 104 may facilitate communication between the content server(s) 110 and/or the user devices 108 associated with the users 106.

The users 106 may interact with the service provider 102 via a site (i.e., a website), a self-service merchant portal, a self-service interface, or in any other manner. In at least one example, the users 106 may include consumers interacting with the service provider 102 to acquire one or more items on behalf of other users 106 (e.g., merchants) and/or the service provider 102. In various examples, the consumers may acquire the items on behalf of the merchants and/or the service provider 102 by actuating a control on a user interface presented on a display 130 of a user device 108 to purchase the items. The control may be associated with a hyperlink that directs the user 106 to a new user interface and prompts the user 106 to input information for purchasing the item (e.g., banking information, etc.). Based at least in part on purchasing the items over the computer network, the user 106 may receive the items by physical mail.

As described above, the users 106 may include merchants. In various examples, the merchants may be any individual or entity that is a source or a distributor of items that may be acquired by the users 106 (e.g., consumers). For example, the merchants may include entities that provide products or services to consumers, which may be offered or promoted directly by the merchants or by the service provider 102 or on behalf of the merchants. The merchants may also offer those items via a physical location (e.g., a brick-and-mortar store), a merchant-branded merchant site (e.g., website), an intermediary marketplace. The merchants may provide items to the users 106 with the assistance of one or more user devices 108, which may include any type of device. Moreover, the merchants may interact with the service provider 102 via a site (i.e., a website), a self-service merchant portal, a self-service interface, or in any other manner.

In at least one example, merchants and/or intermediary marketplaces may calculate scores corresponding to the fit characteristics and utilize the fit characteristics described herein as attributes to supplement physical measurements of their own products and/or sizes. That is, merchants and/or intermediary marketplaces may incorporate fit characteristics into their product descriptions, labels, marketing materials, etc. In some examples, when the service provider 102 offers products on behalf of the merchants and/or intermediary marketplaces, the merchants and/or intermediary marketplaces may use the fit characteristics when they list their products with the service provider 102.

In some examples, the users 106 may operate corresponding user devices 108 to perform various functions associated with the user devices 108, which may include at least some of the operations and/or modules discussed above with respect to the service provider 102.

As shown, the service provider 102 may include one or more content server(s) 110, which may include one or more processor(s) 112 and computer-readable media 114. In various examples, the processor(s) 112 may execute one or more modules and/or processes to cause the content server(s) 110 to perform a variety of functions, as set forth above and explained in further detail in the following disclosure. In some embodiments, the processor(s) 112 may include a central processing unit (CPU), a graphics processing unit (GPU), both CPU and GPU, or other processing units or components known in the art. Additionally, each of the processor(s) 112 may possess its own local memory, which also may store program modules, program data, and/or one or more operating systems.

In at least one configuration, the computer-readable media 114 of the content server(s) 110 may include any components that may be used to facilitate interaction between the service provider 102 and the users 106. For example, the computer-readable media 114 may include a data collection module 116, which may include a feedback module 118, a score calculation module 120, a score comparison module 122, a presentation module 124, and a database 126. Depending on the exact configuration and type of the content server(s) 110, the computer-readable media 114 may also include volatile memory (such as RAM), non-volatile memory (such as ROM, flash memory, miniature hard drive, memory card, or the like), or some combination thereof.

The data collection module 116 may receive data from the users 106 (e.g., merchants, consumers, etc.), the service provider 102, etc. In at least one example, the data collection module 116 may receive information associated with users 106 such as user information and actions associated with a retail purchase account associated with a user 106 (e.g., purchases, sales, items on a saved-items list (i.e., a wish-list), browsing history, search history, recommendations, personal demographic information, location proximity, calendar information, etc.). For instance, the data collection module 116 may receive data associated with a retail purchase account indicating garments that a user 106 previously purchased and/or viewed. Additionally or alternatively, the service provider 102 may access and observe user information and actions associated with third party sources and systems (e.g., social networks, professional networks, partner webstore purchases, etc.). The user information may be associated with the user profile and/or stored in the database 126, cloud storage system, or other data repository.

Figure 2B:
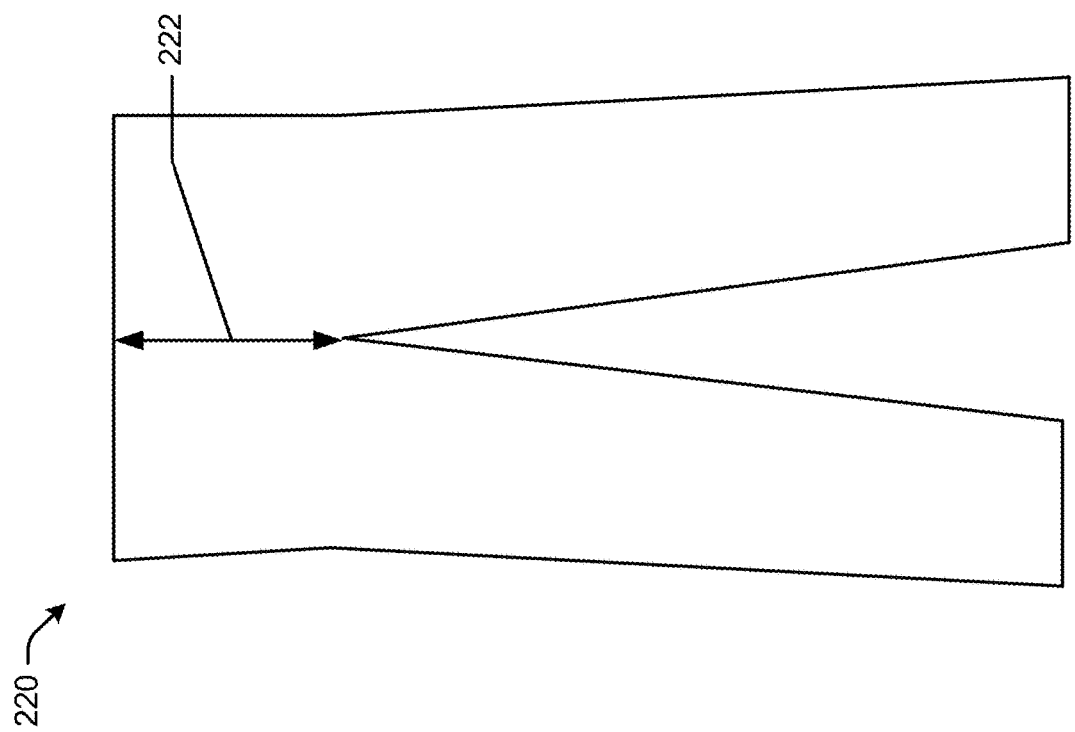
FIG. 2B is a diagram showing a back view of a pair of pants and at least one measurement associated with the pair of pants.
Figure 2A:
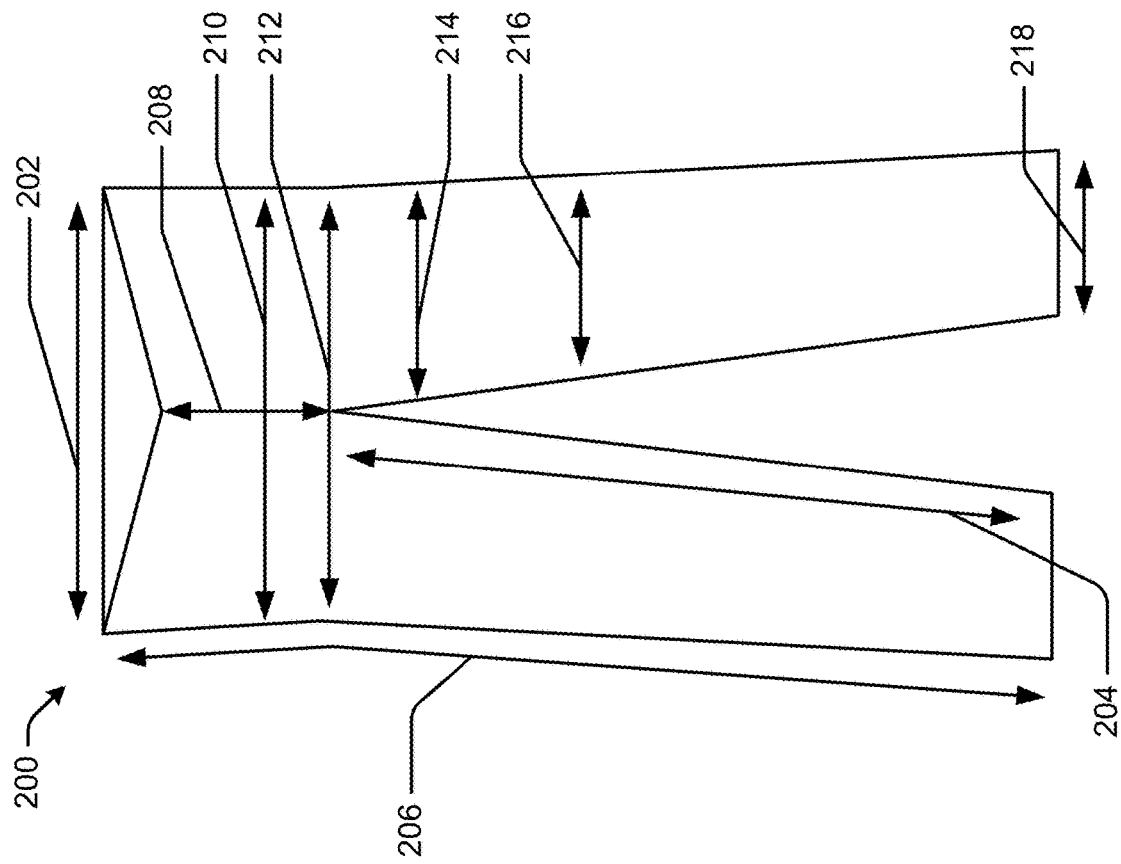
FIG. 2A is a diagram showing a front view of a pair of pants and a plurality of measurements associated with the pair of pants.

The data collection module 116 may also receive data associated with the garments. In at least one example, the data collection module 116 may receive measurements associated with individual garments (e.g., quantitative physical measurements), characteristics associated with the garments (e.g., cotton content, fabric weight, etc.), etc. In some examples, the data collection module 116 may receive measurements based at least in part on receiving measurements associated with individual garments from users 106 (e.g., consumers, merchants, etc.) and/or third party service providers. FIGS. 2A and 2B show a plurality of measurements associated with a pair of pants. Other measurements associated with various other garments (e.g., jackets, dresses, brassieres, etc.) may also be received by the data collection module 116. Users 106, machines, or other mechanisms may measure the garments and may provide the measurements to the data collection module 116. Optimal measurements may be taken when garments lay flat on a hard surface, are buttoned or zipped as they would be worn by a user 106, the fabric has been smoothed so that there are no wrinkles underneath or on top of the fabric, and the fabric has been pulled tight without being stretched.

FIG. 2A is a diagram 200 showing a front view of a pair of pants and a plurality of measurements associated with the pair of pants. A waist measurement 202 is a measurement across a back waistband of a pair of pants from one side to the other with the natural dip. An inseam measurement 204 is a measurement from a crotch seam to the leg opening. An outseam measurement 206 is a measurement from a waistband to the leg opening. A front rise measurement 208 is a measurement from a front crotch seam to a top of the waistband on the front of the garment. A half hip measurement 210 is a measurement across the front of the garment at the base of the fly. A full hip measurement 212 is a measurement across the front of the garment at the crotch seam. A thigh measurement 214 is a measurement across a leg of the pair of pants, measured three inches down from the crotch seam. A knee measurement 216 is a measurement across a leg of the pair of pants 13 inches down from the crotch seam. A leg opening measurement 218 is a measurement across a leg opening from one side of the pant leg to the other side of the pant leg. In at least one example, the measurements are measured to a nearest sub-unit (e.g., ¼", etc.). FIG. 2B is a diagram 220 showing a back view of a pair of pants and at least one measurement associated with the pair of pants. A back rise measurement 222 is a measurement from a back crotch seam to a top of the waistband on the back of the garment.

Figure 2D:
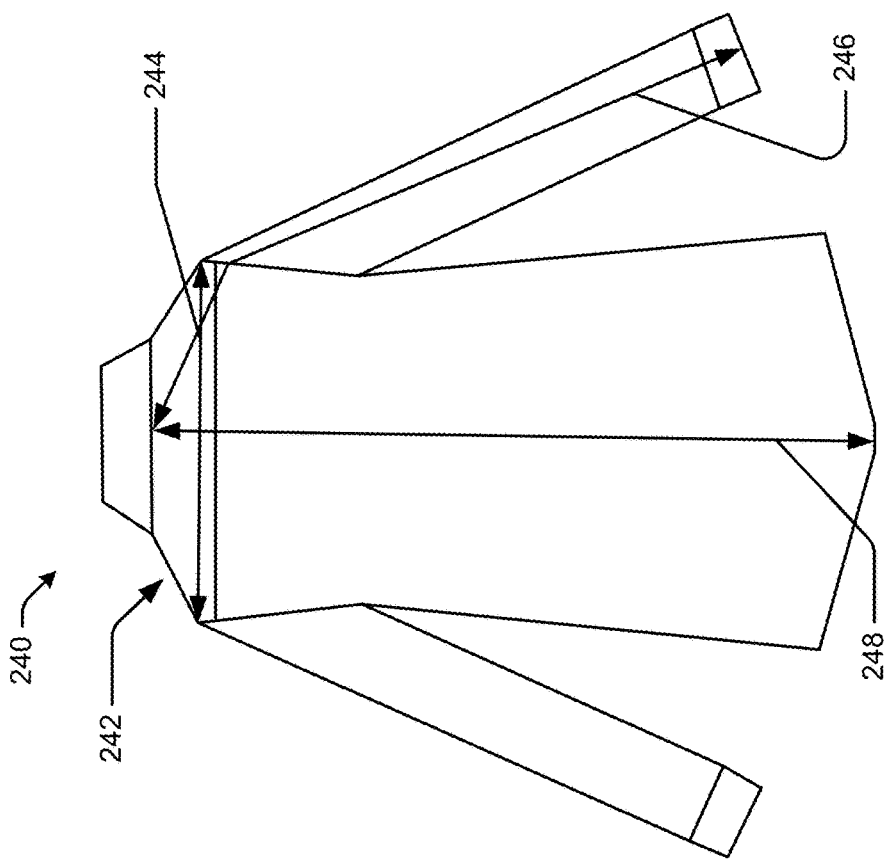
FIG. 2D is a diagram showing a back view of a shirt and a plurality of measurements associated with the shirt.
Figure 2C:
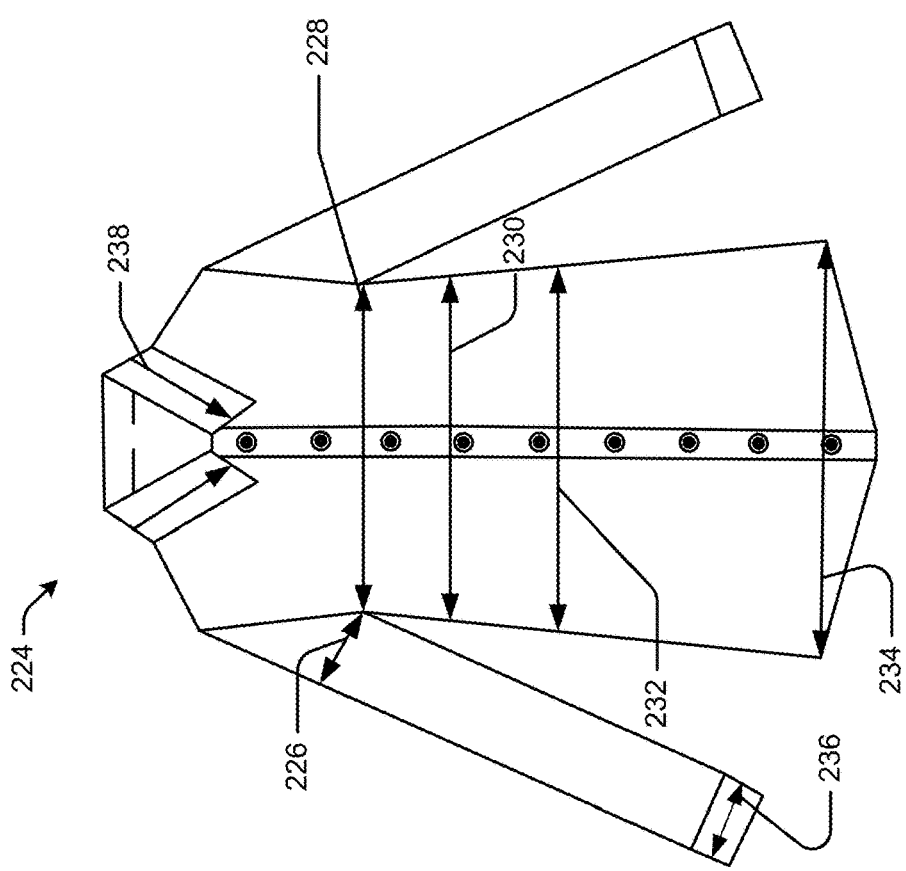
FIG. 2C is a diagram showing a front view of a shirt and a plurality of measurements associated with the shirt.

FIG. 2C is a diagram 224 showing a front view of a shirt and a plurality of measurements associated with the shirt. A bicep measurement 226 is a measurement from a bottom of the sleeve where the sleeve attaches to the body of the shirt to the top folded edge of the shirt so that the measuring device is perpendicular to the top folded edge of the shirt. A chest measurement 228 is a measurement from a top of a seam where a sleeve attaches to a body of the shirt across to a same point on the other side of the shirt. A bust measurement 230 is a measurement from the left side of the shirt three inches down from the armpit to the same position on the right side of the shirt. A waist measurement 232 is a measurement across the most narrow part of the shirt (e.g., about halfway between the armpit and the bottom of the shirt) from the left side of the shirt to the right side of the shirt. A seat measurement 234 is a measurement from the left bottom hem straight across to the same point on the right bottom hem. A cuff measurement 236 is a measurement from a center control of a flattened and spread cuff to the outside edge of the controlhole. A collar measurement 238 is a measurement from the center of the control to the middle of the opposite controlhole of a flattened and spread collar.

FIG. 2D is a diagram 240 showing a back view of a shirt and a plurality of measurements associated with the shirt. For the purpose of this discussion, a yoke 242 is a piece of fabric that sits across the shoulders of a shirt. A shoulder measurement 244 is a measurement from a point on a bottom seam of the yoke where the yoke attaches to the sleeve straight across to a same point on the other side of the shirt. A sleeve length measurement 246 is a measurement from the middle of the yoke, just below the collar band, to the seam where the yoke attaches to the sleeve and then to the edge of the cuff of the sleeve. A total length measurement 248 is a measurement from the seam where the collar band attaches to the yoke straight down the middle of the back of the shirt to the hem at its longest point. In at least one example, the measurements are measured to a nearest sub-unit (e.g., ¼", etc.).

In addition to physical measurements, additional qualitative characteristics may also be determined. In at least one example, the data collection module 116 may utilize collected information concerning the materials constituting the fabric of the item as a proxy for a stretch of the fabric or may utilize measurements of the thickness of the fabric (e.g., using a caliper) as a proxy for a weight of the fabric.

In at least one example, stretch may be determined by physically stretching a garment of interest and comparing it to a predetermined number of samples of other garments having various degrees of stretch. The data collection module 116 may receive an input indicating which of the samples has a stretch determined to be most similar to the garment of interest. In an alternative or additional example, a force meter may be used to apply a predetermined amount of force to a piece of the garment that excludes stitching. A piece of the garment may be attached to a first clamp on one side of the garment. The first clamp may be substantially immobile. The piece of garment may be attached to a second clamp that is clamped on an opposite side of the garment. The second clamp may be pulled by a force meter until the force reported by the force meter is equal to a predetermined amount of force. In the extended position, a distance between the first clamp and the second clamp may be measured and the thickness of the piece of the garment may be measured. The distance measurement and the thickness measurement may be used to calculate a score representative of the stretch of a garment. In at least one example, the score representative of the stretch of the garment may be the Young's modulus, as shown below in Equation 1.

$$\text{Young's modulus} = \frac{(\text{force} \times \text{original length})}{(\text{cross sectional area} \times \text{change in length})} \quad \text{EQUATION 1}$$

In another example, fabric thickness may be measured using a caliper. Returning to FIG. 1, in at least one example, the data collection module 116 may include a feedback module 118 to receive, obtain, and/or determine user feedback from users 106. More particularly, the feedback module 118 may leverage user feedback (e.g., user-provided feedback, user reviews, user ratings, user responses to surveys/questionnaires, etc.), to determine preferences, interests, likes/dislikes, complaints, etc., of the users 106. The feedback module 118 may receive feedback data based at least in part on the service provider 102 or marketplace prompting a user 106 for feedback at a time after the user 106 acquired the garment, at a same time or a time after the user 106 returns the garment, etc. Users 106 may provide feedback via a self-service website, application or browser on a user device 108, customer service, etc. Users 106 may provide feedback by inputting information into a free form text area, by selecting an option from a set of predetermined options (e.g., multiple choice, dropdown menu, etc.). In at least one example, the feedback data may indicate whether a garment fit or did not fit. Feedback data may be stored in the database 126, cloud storage system, or other data repository.

The score calculation module 120 may calculate scores corresponding to fit characteristics associated with garments. The scores may be based at least in part on one or more measurements that can be combined to create the scores. The score calculation module 120 may standardize the one or more measurements relative to one or more corresponding reference measurements. In at least one example, the score calculation module 120 may assign weights to the standardized measurements, as described below.

The score calculation module 120 may access one or more measurements and may generate the one or more standardized measurements to normalize each of the one or more measurements relative to an average measurement. In at least one example, standardizing the one or more measurements may remove magnitudes of differences between the various measurements. A standardized measurement may be based at least in part on a relational score. In at least one example, the score calculation module 120 may determine a relational score of a measurement with respect to an average of a population of a same measurement of other garments designated as a same size as the garment. In other examples, the score calculation module 120 may determine a relational score of a measurement with respect to a same measurement of a garment in a size that is purchased more frequently than any other size (e.g., most commonly purchased size). The relational score may include a distance, a percentage, a multiple of a standard deviation (e.g., z-score) from the average measurement. The average measurements may be determined by averaging a same measurement (e.g., waist of pants) from one or more garments associated with a same size and a same brand, same gender, same fit style, etc. The score calculation module 120 may determine the scores based at least in part on one or more of the standardized measurements. In some examples, the score may be determined based on a single standardized measurement. The score calculation module 120 may combine two or more standardized measurements to calculate the score that corresponds to the fit characteristic. The combination of standardized measurements may vary by fit characteristic.

In at least one example, the score calculation module 120 may select a measurement, such as a waist measurement for a pair of pants in a particular size (e.g., size 8). For instance, the waist measurement may be 34". The score calculation module 120 may generate a standardized waist measurement by normalizing the waist measurement to an average waist measurement for all pairs of paints from a same brand that are the particular size (e.g., size 8). For instance, the average waist measurement may be 32" for all pairs of pants from a same brand that are the particular size (e.g., size 8). In other examples, the score calculation module may standardize the waist measurement by normalizing the waist measurement to an average waist measurement for all pairs of pants associated with a same intended gender, same leg fit style, etc. that are the particular size (e.g., size 8). Accordingly, the score calculation module 120 may determine the standardized waist measurement to be +1.0 standard deviations (i.e., z-score=+1.0) from the average waist measurement for the other pairs of pants of the same brand of the particular size (e.g., size 8). As a result, the pair of pants may have a slightly larger waist fit than the average waist fit for other pairs of pants from the same brand in the particular size (e.g., size 8). In an alternative example, the score calculation module 120 may determine that a standardized waist measurement for a different pair of pants is +3.0 (i.e., z-score=+3.0). As a result, the pair of pants may have a significantly larger waist fit than the average waist fit for other pairs of pants from the same brand in the particular size (e.g., size 8). In some examples, the score calculation module 120 may calculate a standardized measurement by normalizing the measurement to an average measurement for a size of a garment purchased more frequently than the other sizes of the garment from a same brand, having a same intended gender, or having a same leg fit that are the particular size, as described above.

In at least one example, the score calculation module 120 may access the user feedback from the user feedback module 118 and may adjust the scores based on the user feedback. For instance, the score calculation module 120 may access the user feedback and compare the scores with the user feedback. Based at least in part on comparing the scores with the user feedback, the score calculation module 120 may leverage models to calculate confidence scores and/or adjust the scores. The scores may be stored in the database 126, cloud storage system, or other data repository.

The score comparison module 122 may compare fit characteristics associated with two or more garments, as described below. In at least one example, the score comparison module 122 may compare scores representative of fit characteristics associated with two or more garments. In other examples, the score comparison module 122 may compare qualitative descriptions representative of fit characteristics associated with two or more garments. The score comparison module 122 may compare different fit characteristics based on a garment type (e.g., pair of pants, shirt, etc.), intended gender of a purchaser of a garment, etc.

The presentation module 124 may cause one or more graphical representations to be presented to the users 106. The graphical representations may visually summarize relationships between the fit characteristics. As described below, the graphical representations may include heat maps, graphs, pictorial renderings, sliders, etc. In some examples, the presentation module 124 may cause the one or more graphical representations to be presented to the users 106 without any user interaction. In other examples, the presentation module 124 may cause the one or more graphical representations to be presented to the users 106 responsive to a user 106 actuating a control or hyperlink on a display 130 associated with the user device(s) 108.

The database 126 may store at least some data including data associated with user profiles, user 106 information, measurements associated with the garments, feedback data associated with garments, fit characteristics (e.g., scores) associated with the garments, etc. User profile(s) 202 may correspond to one or more user profiles associated with the service provider 102. In some examples, a user profile 202 may include information associated with a user 106 such as user information and actions associated with a retail purchase account associated with a user 106, user information and actions associated with third party sources and systems, etc. In at least one example, user profile(s) 202 may be associated with garments that the user 106 associated with the user profile has indicated as favorite garments and the database 126 may store data associated with the favorite garments. In additional or alternative examples, at least some of the data may be stored in a cloud storage system or other data repository.

Figure 3:
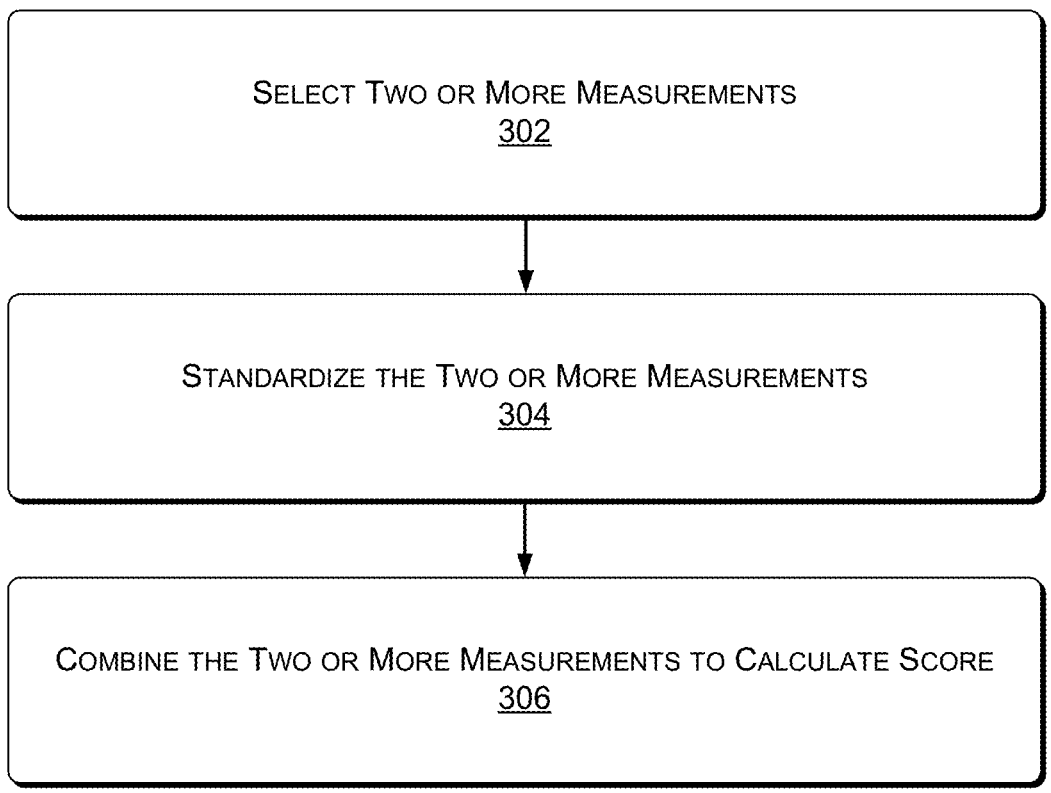
FIG. 3 is a flow diagram showing an illustrative process to determine a score representative of a fit characteristic.
Figure 5:
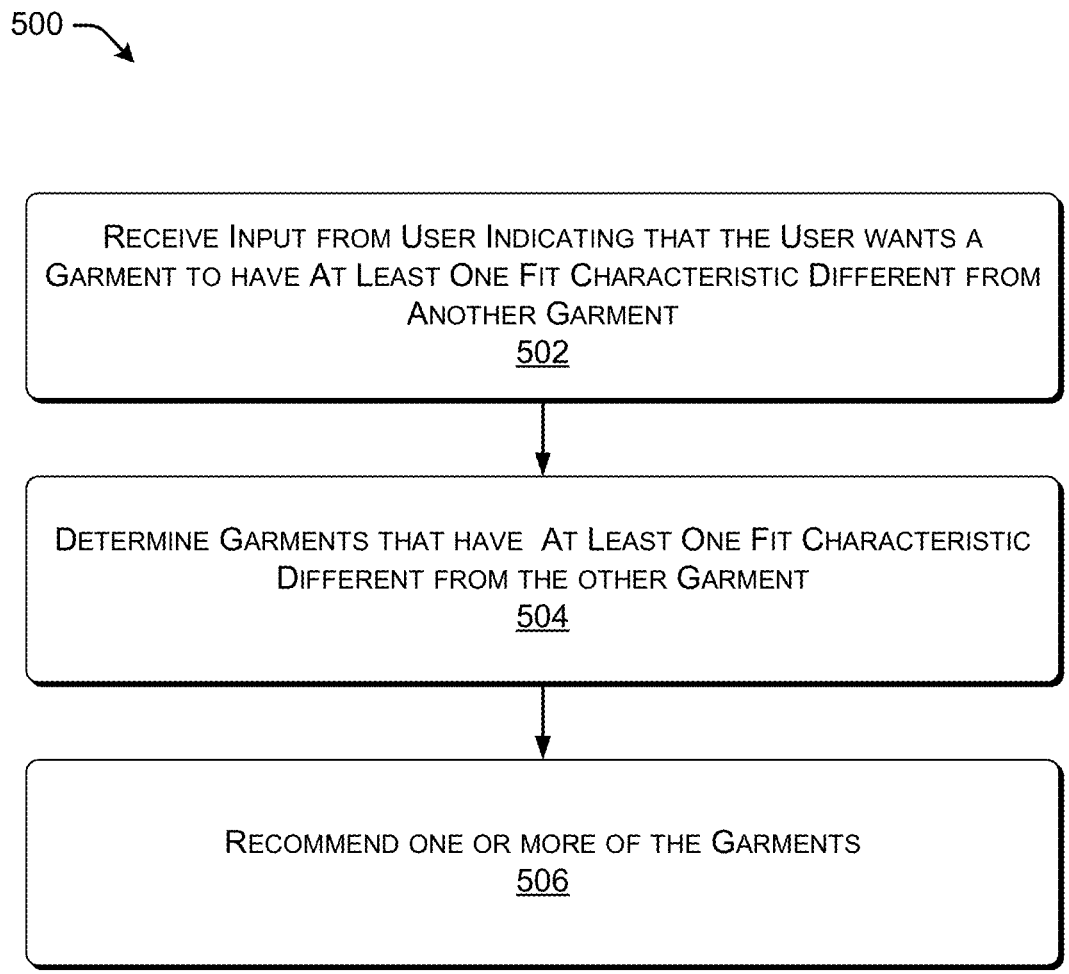
FIG. 5 is a flow diagram showing an illustrative process to select a garment that has a fit characteristic that is different from another garment.

FIGS. 3-5 describe example processes for generating fit characteristics and/or leveraging the fit characteristics for comparing garments. The example processes are described in the context of the environment of FIG. 1 but are not limited to that environment. The processes are illustrated as logical flow graphs, each operation of which represents a sequence of operations that may be implemented in hardware, software, or a combination thereof. In the context of software, the operations represent computer-executable instructions stored on one or more computer-readable media 114 that, when executed by one or more processors 112, perform the recited operations. Generally, computer-executable instructions include routines, programs, objects, components, data structures, and the like that perform particular functions or implement particular abstract data types.

The computer-readable media 114 may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media 114 may include a transitory computer-readable signal (in compressed or uncompressed form). Examples of computer-readable signals, whether modulated using a carrier or not, include, but are not limited to, signals that a computer system hosting or running a computer program may be configured to access, including signals downloaded through the Internet or other networks. The order in which the operations are described is not intended to be construed as a limitation, and any number of the described operations may be combined in any order and/or in parallel to implement the process. Furthermore, the operations described below may be implemented on a single device or multiple devices.

FIG. 3 is a flow diagram showing an illustrative process 300 to determine a score representative of a fit characteristic. In some examples, the score calculation module 120 may calculate a score based on a single standardized score. For instance, for a pair of pants, the score calculation module 120 may calculate a fit characteristic associated with a thigh region of the pair of pants based on the standardized score of the thigh measurement 214. In other examples, one or more measurements may be standardized relative to one or more corresponding reference measurements, the score calculation module 120 may combine two or more scores to calculate the score that corresponds to the fit characteristic.

Block 302 illustrates selecting two or more measurements. The score calculation module 120 may access the two or more measurements from the data collection module 116 and/or the database 126.

Block 304 illustrates standardizing each of the two or more measurements. In at least one example the score calculation module 120 may standardize the two or more measurements. In at least one example, the score calculation module 120 may determine a relational score between each measurement and a reference measurement, e.g., an average measurement, as described above. In some examples, the average measurements may be determined by averaging a same measurement (e.g., waist of pants) from garments associated with a same brand, same gender, same fit style, etc. that are a same size. In other examples, the average measurement may be determined by measuring a garment of a brand, gender, or fit style in a size that is purchased more frequently than any other size.

In some examples, the score calculation module 120 may assign weight to individual measurements of the two or more measurements. The weights may indicate a relative importance of each measurement of the two or more measurements. In at least one example, the back rise measurement 222 may be more important than the waist 202 measurement in determining the seat room fit characteristic. Accordingly, the score calculation module 120 may assign a weight to the back rise measurement 222 that is greater than a weight assigned to the waist measurement 202.

Block 306 illustrates combining the two or more measurements to calculate a score. The score may be representative of a fit characteristic, as described above. The fit characteristic may be associated with a garment as an attribute supplemental to the measurements as indicative of a fit of the garment. Combinations of standardized measurements may vary by fit characteristic, intended gender for the purchasers, etc., as described above.

Examples of Fit Characteristics for Pants

Backside Fit Characteristic

In at least one example, for a pair of pants, the score calculation module 120 may calculate a score representative of a fit characteristic associated with a backside fit based at least in part on a standardized waist measurement 202, standardized back rise measurement 222, standardized front rise measurement 208, standardized half hip measurement 210, and standardized stretch. The sum of the standardized measurements may also be compared with the sum of the average measurements to obtain a standardized sum.

Leg Comfort Fit Characteristic

Additionally or alternatively, for a pair of pants, the score calculation module 120 may calculate a score representative of a fit characteristic associated with a leg comfort fit based at least in part on a standardized thigh measurement 214, a standardized knee measurement 216, and a standardized leg opening measurement 218. The sum of the standardized measurements may also be compared with the sum of the average measurements to obtain a standardized sum.

Seat Comfort Fit Characteristic

The score calculation module 120 may calculate a score representative of a fit characteristic associated with a seat comfort fit for a women's pair of pants based at least in part on a standardized waist measurement 202, standardized back rise measurement 222, standardized front rise measurement 208, standardized half hip measurement 210, and standardized stretch measurement. The score calculation module 120 may calculate a fit characteristic associated with a seat comfort fit for a men's pair of pants based at least in part on a standardized waist measurement 202, standardized back rise measurement 222, standardized front rise measurement 208, standardized half hip measurement 210, standardized stretch measurement, and standardized fabric weight measurement. The sum of the standardized measurements may also be compared with the sum of the average measurements to obtain a standardized sum.

Overall Fit Characteristic

In additional or alternative examples, the score calculation module 120 may combine scores corresponding to two or more fit characteristics to calculate a score for another fit characteristic. For instance, for a pair of pants, the score calculation module 120 may calculate a fit characteristic associated with overall fit based at least in part on a standardized score associated with the seat comfort fit characteristic and a standardized score associated with the leg comfort fit characteristic. In some examples, the score calculation module 120 may calculate the overall fit based further in part on a standardized thigh measurement, standardized knee measurement, and/or a standardized leg opening measurement.

Examples of Fit Characteristics for Shirts

Bust Fit Characteristic

For a shirt, the score calculation module 120 may calculate a score representative of a fit characteristic associated with a bust fit based at least in part on a standardized shoulder measurement 244, standardized chest measurement 228, and standardized bust measurement 230. The sum of the standardized measurements may also be compared with the sum of the average measurements to obtain a standardized sum.

FIG. 4 is a flow diagram showing an illustrative process 400 to cause a user interface for comparing fit characteristics between two or more garments to be displayed to a user 106.

Block 402 illustrates determining a set of fit characteristics for a first garment. The score calculation module 120 may calculate a set of scores representative of a set of fit characteristics for the first garment. The fit characteristics that make up the set of fit characteristics may vary based on types of garments and the intended gender of the purchaser of the garment. In some examples, individual scores of a first set of scores corresponding to the set of fit characteristics may be based at least in part on one or more measurements associated with the first garment. The score calculation module 120 may access the one or more measurements from the data collection module 116 and/or the database 126. In some examples, the score calculation module 120 may standardize individual of the measurements to calculate the scores. In at least one example, the first garment may be a garment that a user 106 is currently viewing and/or interested in purchasing.

Block 404 illustrates determining a set of fit characteristics for a second garment. The score calculation module 120 may determine the set of fit characteristics for a second garment. Individual scores of a second set of scores corresponding to the set of fit characteristics are based at least in part on one or more measurements associated with the second garment. The second set of scores, corresponding to the same fit characteristics determined for the first garment, may be determined based at least in part on one or more standardized measurements as described above.

In at least one example, the second garment may include a previously purchased garment, a garment offered by a same brand as the first garment, a recently viewed garment, or a garment that has a same fit style as the first garment. In some examples, the second garment may include a garment offered by the service provider 102 and the score calculation module 120 may access the measurements from the database 126, cloud storage, or other data repository. In other examples, the second garment may include a garment offered by a third party and the score calculation module 120 may access the measurements from the database 126, cloud storage, or other data repository. In at least one example, the second garment may include a garment the user 106 owns. The user 106 may input the measurements associated with the garment the user 106 owns into the data collection module 116. In some examples, the user 106 may input physical measurements. In other examples, the user 106 may input qualitative descriptions. In additional or alternative examples, the user 106 may use a device to obtain measurements. For instance, the user 106 may take photos of the garment and the data collection module 116 may process the photos to determine measurements associated with the garment.

In at least one example, the user 106 may select the second garment from a menu, plurality of images, etc. The menu may be prepopulated with garments that the user 106 previously purchased, garments that the user 106 previously viewed, etc. The plurality of images may represent garments that the user 106 previously purchased, garments that the user 106 previously viewed, garments associated with a particular brand, etc. In at least one example the plurality of images may be returned in response to a search query associated with a brand, fit style, etc.

In some examples, the second garment may be identified by the score comparison module 122 based at least in part on user information and actions associated with a retail purchase account associated with a user 106 (e.g., purchases, sales, items on a saved-items list (i.e., a wish-list), browsing history, search history, recommendations, personal demographic information, location proximity, calendar information, etc.) or user information and actions associated with third party sources and systems (e.g., social networks, professional networks, partner webstore purchases, etc.). In other examples, the second garment may be identified by the score comparison module 122 based at least in part on receiving input from a user 106 that the user 106 wants the second garment to have at least one fit characteristic in the second garment to be different from at least one fit characteristic in the first garment, as described below.

Block 406 illustrates comparing the first set of scores associated with the first garment to the second set of scores associated with the second garment. The score comparison module 122 may compare the fit characteristics associated with the first garment and the second garment based at least in part on comparing the scores representative of the fit characteristics. In at least one example, the score comparison module 122 may access the fit characteristics, and representative scores, from the database 126. The score comparison module 122 may identify an individual fit characteristic and the scores that correspond to the fit characteristic for the first garment and the second garment. In some examples, the score comparison module 122 may determine that the score associated with the first garment is greater than the corresponding score that is associated with the second garment. Accordingly, the first garment may be looser, bigger, or more comfortable than the second garment with respect to that fit characteristic. In other examples, the score comparison module 122 may determine that the score associated with the first garment is less than the corresponding score that is associated with the second garment. Accordingly, the first garment may be smaller, tighter, or less comfortable than the second garment with respect to that fit characteristic.

Block 408 illustrates causing a user interface to be displayed to compare garments. The presentation module 124 may cause a user interface to be presented to the user 106 to enable the user 106 to visualize how two garments compare with respect to fit, as discussed below in FIG. 6, for example. The user interface may summarize a relationship between the first score and the second score (i.e., the fit characteristic associated with the first garment and the fit characteristic associated with the second garment). In at least one example, the user interface may include at least one graphical representation, as discussed below in FIGS. 7A-7D, for example. The at least one graphical representation may visually summarize the relationship between the first score and the second score. The at least one graphical representation may include a heat map, graph, pictorial rendering, slider(s), etc. In other examples, the user interface may include text that describes the relationship between the first score and the second score (e.g., the fit characteristics).

FIG. 5 is a flow diagram showing an illustrative process 500 to select a garment that has a fit characteristic that is different from another garment (e.g., a garment a user 106 previously purchased, viewed, etc.). In at least one example, the score comparison module 122 may select one or more garments for comparison based at least in part on receiving input from a user 106.

Block 502 illustrates receiving input from a user 106 indicating that the user 106 wants a garment to have at least one fit characteristic different from another garment. As described above, the user 106 may indicate that he or she wants a garment to have at least one fit characteristic that is different from a corresponding fit characteristic in another garment. For instance, a user 106 may indicate that he wants a pair of jeans to fit similar to a pair of jeans that he owns but is looser in the leg than the pair of jeans that he owns. Accordingly, the user 106 may indicate that he wants a new pair of jeans to have a larger leg fit characteristic. Similarly, a user 106 may indicate that she wants a pair of jeans to fit similar to the jeans that she usually buys from a particular brand but that has more stretch. Accordingly, the user 106 may indicate that she wants a new pair of jeans with a larger stretch fit characteristic.

A user 106 may indicate which fit characteristics he or she wants to be different in another garment using various mechanisms. In at least one example, the presentation module 124 may cause a menu corresponding to each fit characteristic to be presented to the user 106. The user 106 may indicate whether he or she wants each fit characteristic to fit similar, looser, tighter, etc. In some examples, a wizard may be used to ask the user 106 a plurality of questions about the fit characteristics associated with a garment. In other examples, the user 106 may interact with the graphical representations to indicate which fit characteristics he or she wants to be different in another garment. For instance, a user 106 may hover over an area that he or she is not satisfied with and the presentation module 124 may cause a set of options to be presented to the user 106 (e.g., looser, tighter, etc.). The user 106 may select one of the options. In other examples, a user 106 may position a slider associated with a fit characteristic in a certain position indicating how the user 106 wants that fit characteristic fit (e.g., looser, tighter, etc.).

Block 504 illustrates determining garments that have at least one fit characteristic different from another garment. The score comparison module 122 may compare scores corresponding to the fit characteristics associated with the garments. With respect to at least one fit characteristic identified by the user 106 that the user 106 wants to be different from another garment, the score comparison module 122 may determine one or more garments have scores representative of the at least one fit characteristic that are different from the other garment.

Block 506 illustrates recommending one or more of the garments. The score comparison module 122 may recommend one or more of the garments to the user 106, which the user 106 may then select and purchase, for example. In at least one example, the score comparison module 122 may recommend one or more of the garments based at least in part on the at least one fit characteristic being different from the fit characteristic in the other garment and the other fit characteristics being within predetermined thresholds of the fit characteristics associated with the other garment.

The aforementioned techniques include a set of illustrative techniques for creating fit characteristics associated with garments. However other techniques may be employed to accomplish similar results.

FIG. 6 is a diagram showing an example user interface 600 that the presentation module 124 may cause to be presented to a user 106 for comparing fit characteristics between two or more garments. The presentation module 124 may cause a user interface (e.g., user interface 600) to be presented to users 106 utilizing any communication channel, such as an e-mail message, a site (e.g., website) associated with the service provider 102, a text message, a social network site, an application that is associated with the service provider 102 and that resides on user device(s) 108 of the users 106, etc.

As a non-limiting example, the user interface 600 may include product information 602 that describes the garment and one or more images, photos, etc., 604 that represent the garment. For instance, the product information 602 may include a brand of the product, a price of the product, a size of the product, descriptive information about the product, etc. In at least some examples, a user 106 may select a size from a drop down menu. In other examples, the service provider 102 may recommend a size for the user 106. The user interface 600 may include a region 606 for indicating a garment that is being used for the comparison.

The presentation module 126 may cause one or more graphical representations to be presented to the user 106 in a region of the user interface 600, such as region 608. As described above, the graphical representations may include heat maps, graphs, pictorial representations, or other representations that visually summarize comparisons between fit characteristics. In some examples, graphical representations for individual fit characteristics may be caused to be presented. In other examples, graphical representations for a plurality of fit characteristics may be caused to be presented. A user 106 may acquire the product by actuating a control 610 or by providing another indication that he or she would like to acquire the product.

The user interface 600 is one example of a user interface that facilitates the acquisition of a product and display of one or more graphical representations, and any other presentation or configuration may be used. For instance, the user interface 600 may include two or more products and the presentation module 124 may cause graphical representations associated with the two or more products to be presented to the user 106 for comparison shopping. In at least one example, the user interface 600 may include a plurality of search results and one or more fit characteristics and/or graphical representations may be associated with individual of the search results.

As described above, the presentation module 124 causes a user interface to be displayed to a user 106 that may include a region 608 that displays content to summarize the relationship between the fit characteristics. In at least one example, the region 608 may include text that may describe differences between fit characteristics. For instance, the region 608 may indicate that a garment the user 106 is currently viewing has "less stretch and a looser leg fit" when compared to another garment. In other examples, the region 608 may include graphical representations that may visually summarize differences between fit characteristics. FIG. 7A is a diagram showing a non-limiting example of a graphical representation 700 for comparing fit characteristics between two garments. Graphical representation 700 includes a description 702 of the garment that the user 106 is viewing and may also include a description of the garment that is being used for comparison. As illustrated in graphical representation 700, a drop down menu 704 may include the description of the garment that is being used for comparison (i.e., Brand X Modern Curve . . . ).

The graphical representation 700 may include a heat map 706 that visually summarizes the relationship between the two garments. The heat map 706 may leverage various indicators (e.g., colors, hatching, patterns, etc.) to represent data. A key 708 to the heat map is shown in graphical representation 700. For at least one fit characteristic (e.g., leg fit) the heat map may leverage a first indicator to indicate that the score corresponding to the fit characteristic in a first garment (e.g., Brand A jeans) is greater than a corresponding score in a second garment, the garment being used for comparison (e.g., Brand X Modern Curve jeans). For instance, for the leg fit characteristic, the Brand A jeans are slightly looser than the Brand X Modern Curve jeans as shown by the corresponding hatching on the heat map 706. The heat map 706 also includes a textual summary "slightly looser leg." For other fit characteristics (e.g., backside fit), the heat map may leverage a second indicator to indicate that the score corresponding to the fit characteristic in a first garment (e.g., Brand A) is less than a corresponding score in the second garment, the garment being used for comparison (e.g., Brand X Modern Curve). For instance, for the backside fit characteristic, the Brand A jeans are tighter than the Brand X Modern Curve as shown by the corresponding hatching on the heat map. The heat map 706 also includes a textual summary "tighter backside." The graphical representation 700 is one example of a graphical representation that visually summarizes fit characteristics associated with two garments, and any other presentation or configuration may be used.

Figure 7B:
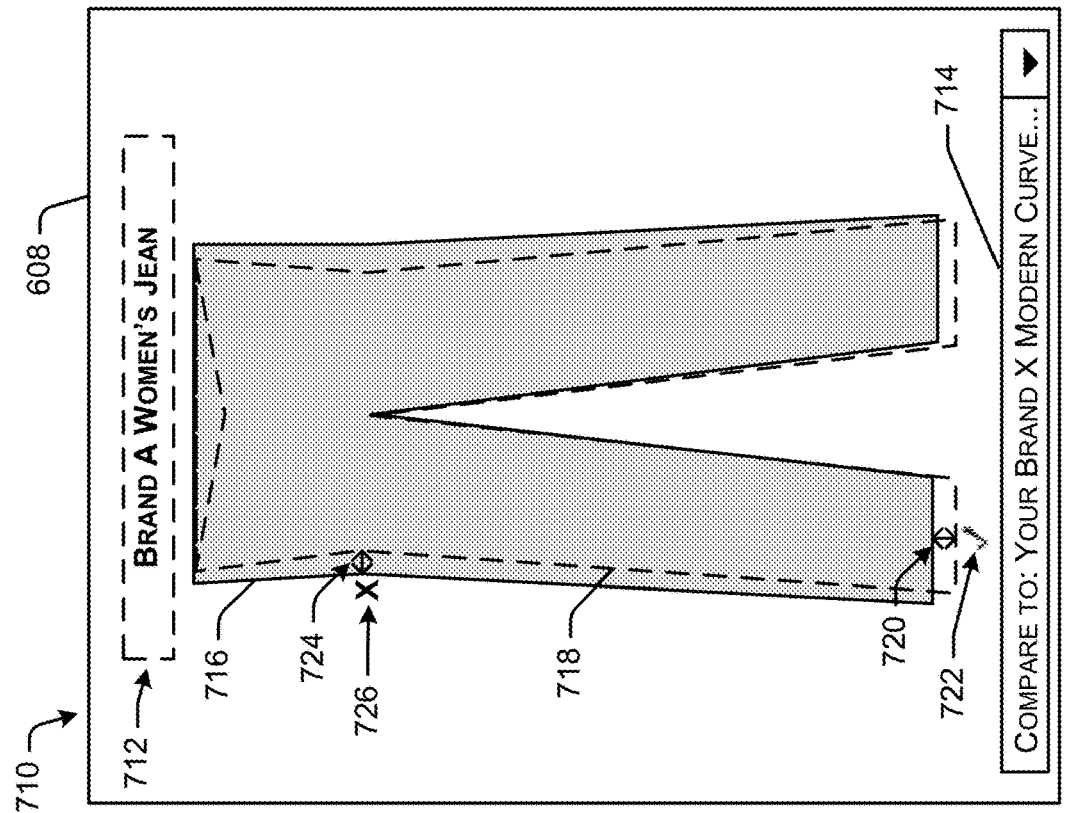
FIG. 7B is a diagram showing an example of a graphical representation for comparing fit characteristics between two garments.
Figure 7A:
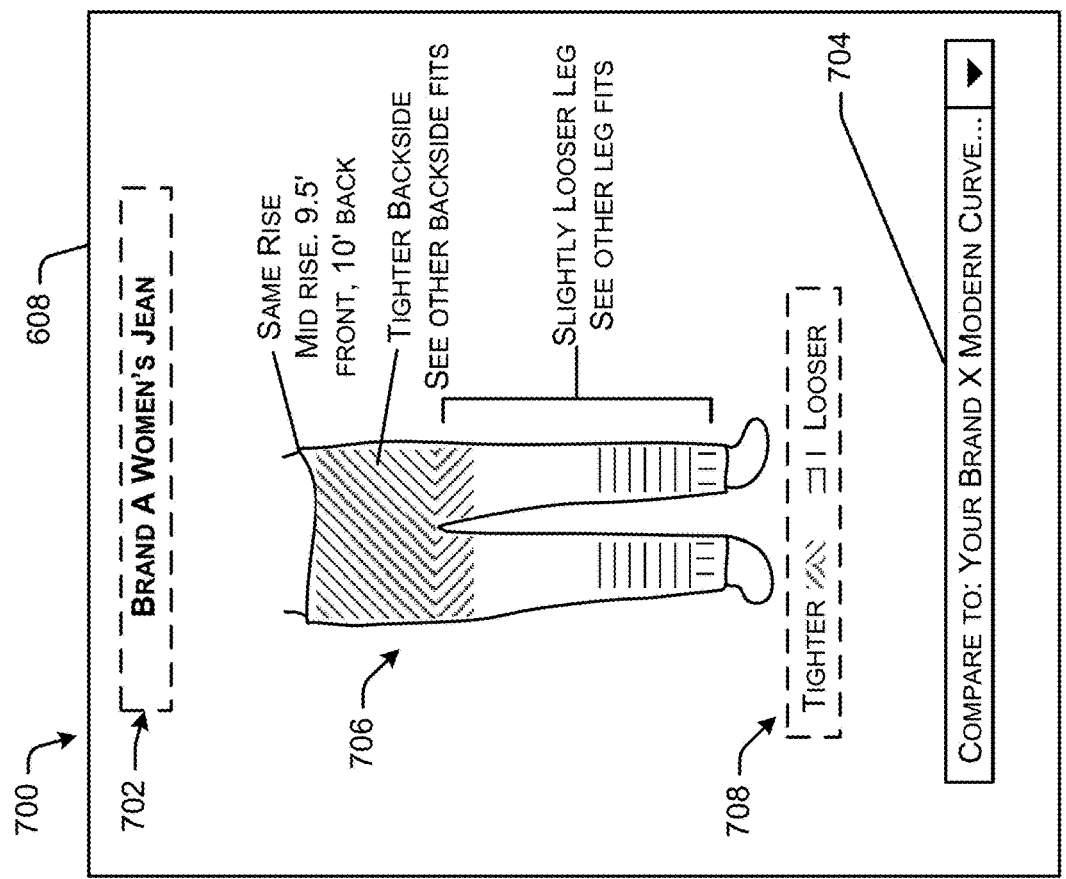
FIG. 7A is a diagram showing an example of a graphical representation for comparing fit characteristics between two garments.

FIG. 7B is a diagram showing an example of a graphical representation 710 for comparing fit characteristics between two garments. In some examples, a graphical representation may compare fit characteristics between more than two garments in a display similar to the one shown in FIG. 7B. Graphical representation 710 includes a description 712 of the garment the user 106 is viewing and may also include a description of the garment that is being used for comparison. As illustrated in graphical representation 710, a drop down menu 714 may include the description of the garment that is being used for comparison (i.e., Brand X Modern Curve . . . ).

The graphical representation 710 may include a first pictorial rendering associated with a first garment and a second pictorial rendering associated with a second garment that overlays the first pictorial rendering. For instance, the Brand X Modern Curve jeans are represented by a solid gray rendering 716 and the Brand A jeans are represented by a dashed rendering 718 that overlays the solid gray rendering 716. The pictorial renderings may be drawn to scale. The pictorial renderings visually summarize the relationship between the two garments as shown by the arrows depicting differences between fit characteristics.

In at least one example, the user 106 may indicate that he wants some fit characteristics associated with a garment to match fit characteristics associated with a garment he is familiar with (e.g., previously purchased, previously viewed, etc.). Additionally, the user 106 may indicate that he wants other fit characteristics associated with the garment to be different than fit characteristics associated with a garment. The graphical representations may include one or more indications to visually depict whether the garment that the user 106 is looking at meets the user's 106 request. For example, the user 106 may indicate that he wants a new pair of jeans to be longer than the Brand X Modern Curve jeans that he previously purchased. As illustrated in FIG. 7B, for at least one fit characteristic (e.g., leg length) the graphical representation 710 may leverage a first indicator to indicate that the fit characteristic in a new pair of jeans (e.g., Brand A) satisfies the user 106 request with respect to the fit characteristic. For instance, for the leg length fit characteristic, the Brand A jeans are slightly longer than the Brand X Modern Curve jeans as shown by the arrow 720. The checkmark 722 indicates that the length of the Brand A jeans satisfies the user's 106 request for a pair of jeans that are longer in leg length than their Brand X Modern Curve jeans. For other fit characteristics (e.g., hip fit), the graphical representation 710 may leverage a second indicator to indicate that the fit characteristic in a first garment (e.g., Brand A) does not satisfy the user 106 request with respect to the fit characteristic. In at least one example, the user 106 may indicate that he wants the hip signal to be the same as the Brand X Modern Curve that he owns. As illustrated in FIG. 7B, the hip fit characteristic is narrower in the Brand A than the Brand X Modern Curve jeans as shown by the arrow 724. In this example, because the user 106 requested that the hip fit characteristic not change, the graphical representation 710 may use an "X" 726 to indicate that the hip fit characteristic does not satisfy the user's 106 request. The graphical representation 710 is one example of a graphical representation that visually summarizes fit characteristics associated with two garments, and any other presentation or configuration may be used.

FIG. 7C is a diagram showing an example of a graphical representation 728 for comparing fit characteristics between two garments. Graphical representation 728 includes a description 730 of the garment the user 106 is viewing (e.g., Brand A Women's Jean) and may also include a description of the garment that is being used for comparison. As illustrated in graphical representation 728, a drop down menu 732 may include the description of the garment that is being used for comparison (i.e., Brand X Modern Curve . . . ). One or more sliders 734 may be included in the graphical representation 728. Each of the sliders may represent a fit characteristic. In graphical representation 728, the fit characteristics represented include backside fit, leg fit, and seat room fit. A slider 736 may be associated with a region of a slider bar and the placement of the slider 736 on the slider bar may visually summarize how each fit characteristic compares. For instance, in FIG. 7C, the Brand A Women's Jean has looser backside fit than the Brand X Modern Curve. Similarly, the Brand A Women's Jean has looser leg fit and seat room fit than the Brand X Modern Curve. In at least one example, a user 106 may move the sliders along the slider bars to identify how the user 106 wants a garment to fit in comparison to a garment he or she owns (e.g., the Brand X Modern Curve . . . ) and the score comparison module 122 may search, identify, and recommend garments that satisfy the user's 106 requests (e.g., Brand A Women's Jean). The graphical representation 728 is one example of a graphical representation that visually compares fit characteristics between two garments, or that enables a user to search for items that meet selected fit characteristics, and any other presentation or configuration may be used.

FIG. 7D is a diagram showing an example of a graphical representation 738 for comparing a plurality of garments with respect to a particular fit characteristic. In at least one example, a graphical representation may be associated with a single fit characteristic and may visually summarize a relationship between a plurality of garments with respect to that fit characteristic. Graphical representation 738 may include a description of the fit characteristic 740 associated with the graphical representation 738. In FIG. 7D, graphical representation 738 is associated with a backside fit characteristic. Any fit characteristic may be represented, however. The triangles 742 represent individual garments. Various other shapes or indicators may be used. A user 106 may scroll over the triangles 742 and the presentation module 124 may cause corresponding names of the garment represented by the triangles to be presented to the user 106 (e.g., Brand A). A user 106 may click on the name of the garment 744 associated with a particular triangle and the presentation module 124 may cause a corresponding user interface associated with that product (e.g., user interface 600) to be presented to the user 106. In at least one example, a user 106 may use slider bars (like the ones shown in FIG. 7C) to set thresholds between which he or she wants the fit characteristic associated with a new garment to fall within. This may refine the number of indicators (e.g., triangles) that appear on the graphical representation 738 to those that fall within the thresholds determined by the user 106. The graphical representation 738 is one example of a graphical representation that visually compares a plurality of garments with respect to a fit characteristic, and any other presentation or configuration may be used.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
one or more processors; and
a memory that stores one or more modules that are executable by the one or more processors to cause the system to:
- access a plurality of measurements associated with a plurality of garments;
- determine one or more threshold values associated with fit characteristics of the plurality of garments, the one or more threshold values indicating one or more first values that the fit characteristics are not to be below and one or more second values that the fit characteristics are not to exceed;
- determine, based at least in part on the one or more threshold values, a first garment of the plurality of garments for comparison with a second garment of the plurality of garments;
- determine a first score representative of a fit characteristic associated with the first garment, the first score determined based at least in part on:
  - selecting two or more measurements of the plurality of measurements, the two or more measurements associated with the first garment;
  - standardizing the two or more measurements by comparing each of the two or more measurements to a reference measurement; and
  - combining the two or more measurements to calculate the first score;
- determine a second score representative of the fit characteristic associated with the second garment, the second score determined based at least in part on combining a corresponding two or more standardized measurements associated with the second garment;
- compare the first score and the second score;
- generate a user interface including at least a first graphical representation that visually indicates a first relationship between the first score and the second score;
- receive, via the user interface, user input indicating a selection of a third garment of the plurality of garments, wherein the third garment comprises a different garment than the second garment or a different size of the second garment;
- based at least in part on receiving the user input:
  - determine a third score representative of the fit characteristic associated with the third garment, the third score determined based at least in part on combining a corresponding two or more standardized measurements associated with the third garment; and
  - modify the user interface, wherein modifying the user interface comprises replacing the first graphical representation with a second graphical representation that visually indicates a second relationship between the first score and the third score.

2. The system of claim 1, wherein the first garment comprises an item a user is interested in purchasing and wherein the second garment is at least one of previously purchased; associated with a same brand as the first garment; recently viewed; or of a same fit style as the first garment.

3. The system of claim 1, wherein the plurality of garments comprises pants and the fit characteristic is associated with one of stretch, comfort, fabric weight, overall fit, rise, backside fit, or leg fit.

4. The system of claim 1, wherein the plurality of garments comprises shirts and the fit characteristic is associated with one of stretch, comfort, fabric weight, overall fit, arm fit, shoulder fit, or bust fit.

5. The system of claim 1, wherein the first graphical representation comprises a first pictorial rendering associated with the first garment and a second pictorial rendering associated with the second garment that overlays the first pictorial rendering.

6. A computerized method comprising:
- receiving a plurality of measurements associated with a plurality of garments;
- determining one or more threshold values associated with fit characteristics of the plurality of garments, the one or more threshold values indicating one or more first values that the fit characteristics are not to be below and one or more second values that the fit characteristics are not to exceed;
- determining, based at least in part on the one or more threshold values, a first garment of the plurality of garments for comparison with a second garment of the plurality of garments;
- creating a fit characteristic different from the plurality of measurements, a first score corresponding to the fit characteristic calculated by:
  - accessing two or more measurements of the plurality of measurements;
  - standardizing the two or more measurements by comparing at least one of the two or more measurements to a reference measurement; and
  - combining the two or more measurements to calculate the first score;
- associating the fit characteristic with the first garment as an attribute supplemental to the plurality of measurements as indicative of a fit of the first garment;
- determining a second score representative of the fit characteristic associated with the second garment, the second score determined based at least in part on combining a corresponding two or more standardized measurements associated with the second garment;
- comparing the first score and the second score;
- generating a user interface including at least a first graphical representation that visually indicates a first relationship between the first score and the second score;
- receiving, via the user interface, user input indicating a selection of a third garment of the plurality of garments, wherein the third garment comprises a different garment than the second garment or a different size of the second garment;
- based at least in part on receiving the user input:
  - determining a third score representative of the fit characteristic associated with the third garment, the third score determined based at least in part on combining a corresponding two or more standardized measurements associated with the third garment; and
  - modifying the user interface, wherein modifying the user interface comprises replacing the first graphical representation with a second graphical representation that visually indicates a second relationship between the first score and the third score.

7. The computerized method of claim 6, wherein standardizing the two or more measurements comprises, for at least one of the two or more measurements:

generating a standardized measurement by comparing a measurement to a population of same measurements of other garments designated as a same size as the first garment, the comparing to determine a multiple of a standard deviation from an average of the population, the standardized measurement being based at least in part on the multiple of the standard deviation.

8. The computerized method of claim 7, wherein the other garments comprise at least one of:
a plurality of garments associated with a same intended gender;
a plurality of garments associated with a same brand as the first garment; or
a plurality of garments associated with a same fit style as the first garment.

9. The computerized method of claim 6, wherein:
the first garment comprises a pair of pants;
the fit characteristic is associated with seat comfort fit; and
the two or more measurements that are combined to calculate the first score comprise at least a waist measurement, a back rise measurement, a front rise measurement, a half hip measurement, and a stretch measurement.

10. The computerized method of claim 6, wherein:
the first garment comprises a pair of pants;
the fit characteristic is associated with leg comfort; and
the two or more measurements that are combined to calculate the first score comprise a thigh measurement, a knee measurement, and a leg opening measurement.

11. The computerized method of claim 6, wherein:
the first garment comprises a pair of pants;
the fit characteristic is associated with overall fit; and
the two or more measurements that are combined to calculate the first score comprise a third score associated with seat comfort fit and a fourth score associated with leg comfort.

12. The computerized method of claim 6, wherein:
the first garment comprises a shirt;
the fit characteristic is associated with bust fit; and
the two or more measurements that are combined to determine the first score comprise a shoulder measurement, a chest measurement, and a bust measurement.

13. The computerized method of claim 6, further comprising adjusting the first score based at least in part on user feedback.

14. The computerized method of claim 6, wherein the user input comprises a second selection of a description of the third garment from a list comprising a description of the second garment and the description of the third garment.

15. The system of claim 1, wherein the second garment comprises an item a user is interested in purchasing and wherein the first garment is at least one of previously purchased, associated with a same brand as the second garment, recently viewed, or of a same fit style as the second garment.

16. A computerized method comprising:
accessing a plurality of measurements associated with a plurality of garments;
determining one or more threshold values associated with a fit characteristic of the plurality of garments, the one or more threshold values indicating one or more first values that the fit characteristic is not to be below and one or more second values that the fit characteristic is not to exceed;
determining, based at least in part on the one or more threshold values, a first garment of the plurality of garments for comparison with a second garment of the plurality of garments;
determining a first score representative of a fit characteristic associated with the first garment, wherein the fit characteristic is different from the plurality of measurements, and wherein the first score is calculated by:
standardizing two or more measurements of the plurality of measurements by comparing at least one measurement of the two or more measurements to a reference measurement; and
combining the two or more measurements to calculate the first score;
determining a second score representative of the fit characteristic associated with the second garment, the second score determined based at least in part on combining a corresponding two or more standardized measurements associated with the second garment;
generating a user interface including at least a first graphical representation that visually indicates a first relationship between the first score and the second score;
receiving, via the user interface, user input indicating a selection of a third garment of the plurality of garments, wherein the third garment comprises a different garment than the second garment or a different size of the second garment;
based at least in part on receiving the user input:
determining a third score representative of the fit characteristic associated with the third garment, the third score determined based at least in part on combining a corresponding two or more standardized measurements associated with the third garment; and
modifying the user interface, wherein modifying the user interface comprises replacing the first graphical representation with a second graphical representation that visually indicates a second relationship between the first score and the third score.

17. The computerized method of claim 16, wherein the user interface further includes a slider movable along a slider bar to a desired fit for the fit characteristic.

18. The computerized method of claim 16, wherein the reference measurement includes an average measurement associated with a subset of the plurality of garments that are of a same size and at least one of a same brand, a same gender, or a same style.

19. The computerized method of claim 16, further comprising:
accessing first user feedback associated with the first garment;
adjusting the first score based at least in part on the first user feedback to generate an adjusted score; and
associating the adjusted score with the first garment.

20. The computerized method of claim 16, wherein:
the first garment comprises a garment owned by a user; and
the one or more measurements associated with the first garment are received from the user.

* * * * *